United States Patent
Stoner

[15] 3,684,059
[45] Aug. 15, 1972

[54] CHAIN LUBRICATING APPARATUS
[72] Inventor: Jack L. Stoner, 115 N. Court St., Standish, Mich. 48658
[22] Filed: April 20, 1970
[21] Appl. No.: 30,025

[52] U.S. Cl. ...............................................184/15 B
[51] Int. Cl............................................F16n 7/22
[58] Field of Search.....184/2, 3, 3 A, 15, 15 A, 15 B; 74/230

[56] References Cited

UNITED STATES PATENTS

| | | | |
|---|---|---|---|
| 3,155,192 | 11/1964 | James | 184/15 A |
| 3,113,337 | 12/1963 | Lyden | 184/15 |
| 1,990,408 | 2/1935 | Kerst et al. | 184/2 |
| 3,116,810 | 1/1964 | Olson | 184/15 B |
| 2,570,179 | 10/1951 | Rivers | 184/2 |

FOREIGN PATENTS OR APPLICATIONS

| | | | |
|---|---|---|---|
| 144,181 | 3/1961 | U.S.S.R. | 184/15 B |
| 448,793 | 6/1936 | Great Britain | 184/15 B |
| 613,221 | 11/1948 | Great Britain | 184/15 B |
| 911,755 | 11/1962 | Great Britain | 184/15 B |

*Primary Examiner*—Manuel A. Antonakas
*Attorney*—Learman, Learman & McCulloch

[57] ABSTRACT

Apparatus for lubricating a chain composed of a plurality of links pivoted to one another, alternate ones of the links having openings therein, the apparatus comprising a carrier pivoted adjacent the chain and having nozzles movable into and out of the chain openings and through which a limited quantity of lubricant may be discharged in opposite directions so as to lubricate the pivot pins at opposite ends of each link.

5 Claims, 3 Drawing Figures

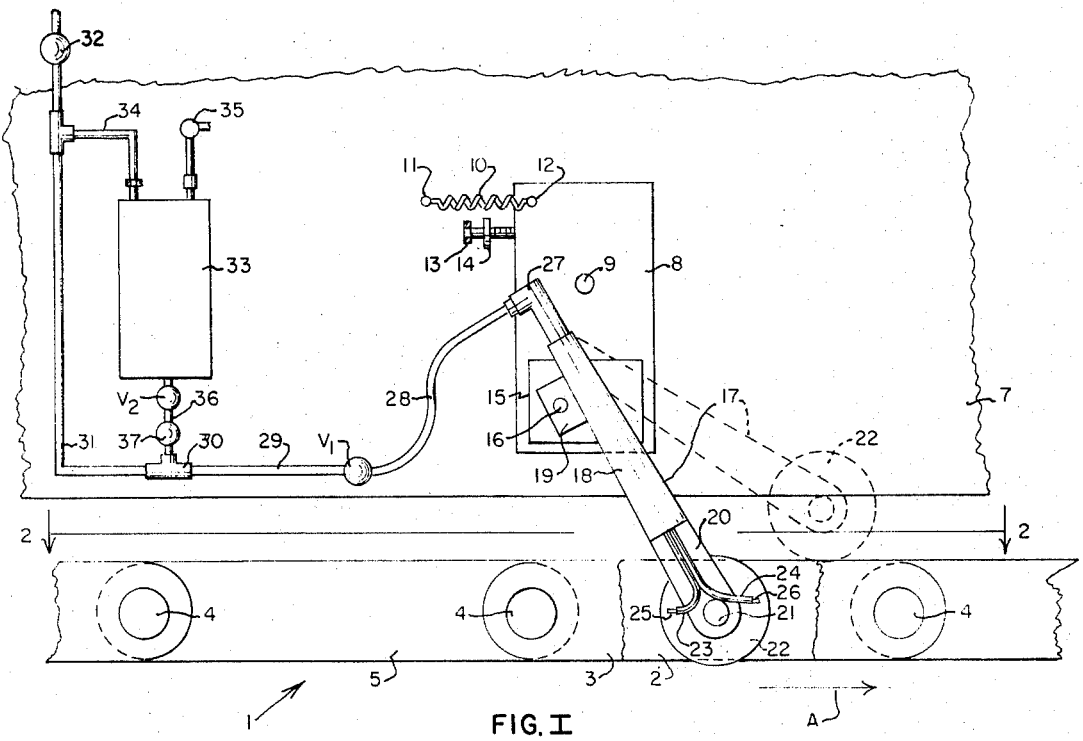
FIG. I
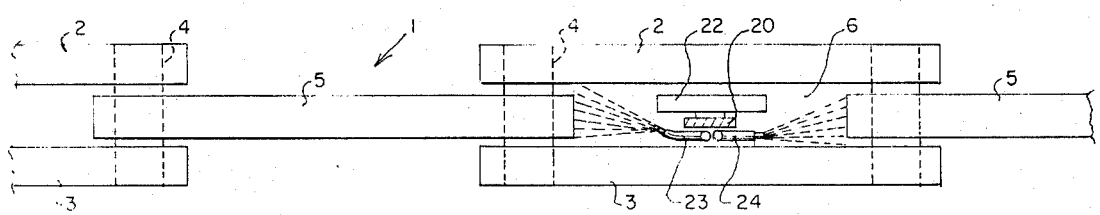
FIG. 2
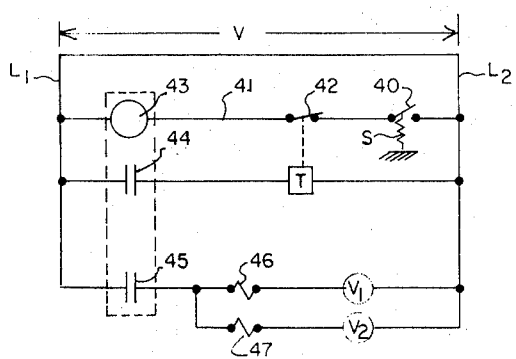
FIG. 3
INVENTOR.
JACK L. STONER

CHAIN LUBRICATING APPARATUS

The invention disclosed herein relates to apparatus for lubricating automatically the pivoted joints between successive chain links and more particularly to chain lubricating apparatus which is operable in response to movement of the chain to discharge a metered quantity of lubricant to each of the pivotal joints between adjacent links.

Conveyor chains of the kind frequently used in automated material handling equipment comprise links composed of pairs of spaced apart bars pivoted at their opposite ends to connecting links which, in turn, are pivoted to similar pairs of spaced apart bars. Conveyor chains of this kind frequently are hundreds of feet in length and are utilized to carry workpieces through a plurality of work stations. The runs of the chain have to negotiate turns which results in relative movement between the links and their connecting pivot pins. Unless the joints between adjacent links are lubricated the pins, the links, or both, are subjected to excessive wear which may result in failure of one or more links of the chain with consequent work stoppage. To avoid as much as possible such chain failures it has been necessary heretofore to provide substantially continuous supervision and maintenance of the chains.

Various kinds of automatic and semi-automatic chain lubricating devices have been proposed heretofore, but they have not been altogether satisfactory for a number of reasons. For example, most of the known chain lubricating devices require complex and delicate timing devices to control the application of lubricant to the joints. Such timing devices frequently become either wholly or partially inoperative and require considerable maintenance. Moreover, timing devices of the kind utilized heretofore frequently become unsynchronized with the arrival of chain joints at the lubricating station, thereby resulting in inadequate lubrication of the joints and consequent waste of lubricant. Furthermore, conventional chain lubricating devices discharge the lubricant in spaced relation to the plane of the chain to be lubricated, thereby making it possible for air currents to prevent deposition of the lubricant in the desired zones.

An object of this invention is to provide chain lubricating apparatus which overcomes the disadvantages of previously known devices for a similar purpose.

Another object of the invention is to provide a chain lubricating mechanism that is operated by movement of the chain and which is operable to direct lubricant precisely to the zones desired.

A further object of the invention is to provide chain lubricating apparatus of the kind referred to and wherein the timing of the lubricant discharge is governed solely by the positioning of the lubricating apparatus at a proper location to effect the desired lubrication.

Other objects and advantages of the invention will be pointed out specifically or will become apparent from the following description when it is considered in conjunction with the appended claims and the accompanying drawings, in which:

FIG. 1 is a fragmentary, side elevational view illustrating chain lubricating apparatus constructed in accordance with the invention and a portion of the chain to be lubricated;

FIG. 2 is a sectional view taken on the line 2 — 2 of FIG. 1; and

FIG. 3 is a simplified, schematic wiring diagram.

Apparatus constructed in accordance with the invention is adapted for use in conjunction with a conventional chain 1 composed of spaced apart, parallel bars 2 and 3 pivoted at corresponding ends by means of pins 4 to connecting links 5, the links 5 alternating with the pairs of bars 2 and 3 and the links 5 being interposed between the bars 2 and 3 so as to define a space 6 therebetween. The illustrated portion of the chain 1 constitutes one run of an endless chain which may be mounted in a conventional manner and driven in the direction of the arrow A by any suitable and conventional driving means.

Adjacent the chain 1 is secured a support 7 and on which is pivoted a mounting block 8 by means of a pin 9. A spring 10 has one of its ends fixed to an anchor post 11 carried by the support 7 and its other end secured to a post 12 carried by the mounting block 8. The spring urges the block 9 to rotate counterclockwise, but permits clockwise rotation of the block. Counterclockwise movement of the block 9 is limited by an adjustable screw 13 mounted in a nut-like device 14 mounted on the support 7.

Fixed to the mounting block 9 is a switch housing 15 of conventional construction having normally open switch contacts therein and having a rock shaft 16 projecting therefrom by means of which the contacts of the switch (to be described hereinafter) may be moved between open and closed positions. A carrier designated generally by the reference character 17 has a tubular body 18 and includes a flange 19 that is fixed to the shaft 16 so as to impart rotation to the latter. The body 18 is closed at both ends and that end of the body which is adjacent the chain 1 includes an extension 20 provided with a stub shaft 21 on which is mounted a follower wheel 22. The thickness of the extension 20 and the thickness and diameter of the wheel 22 are such as to permit the latter to be accommodated in the space 6 between the bars 2 and 3.

In communication with the interior of the body 18 at one end of the latter is a pair of conduits 23 and 24 provided at their free ends with lubricant discharge means such as nozzles 25 and 26, respectively. In communication with the opposite end of the body 18 is a tubular fitting 27 to which is joined one end of a flexible conduit 28, the opposite end of which is fitted to a solenoid actuated valve $V_1$. Also joined to the valve $V_1$ is one end of a tube 29, the opposite end of which is fitted to a tee coupling 30. A tube 31 extends from the coupling 30 to a source of compressed air via a pressure regulator 32.

A tank 33 is mounted on the support 7 and contains a quantity of oil or other lubricant. In communication with the tank at the upper end of the latter is a tube 34 which delivers air under pressure from the line 31 to the interior of the tank 33. A bleed valve 35 permits venting of the tank.

From the bottom of the tank 31 extends a line 36 which is coupled to the tee fitting 30 so as to enable lubricant to be discharged from the tank 33 to the line 29. Mounted in the line 36 is a solenoid operated valve $V_2$ and a manually operated needle valve 37.

To condition the apparatus for operation, the carrier 17 is mounted adjacent the chain 1 in such manner that the wheel 22 is capable of rolling upon each of the connecting links 5 and entering the space 6 between the pairs of bars 2 and 3. The shaft 16 is urged to rock in a clockwise direction by a spring S (shown diagrammatically in FIG. 3) associated with a normally open switch 40 in the housing 15, thereby constantly biasing the carrier 17 to rock clockwise, but engagement of the wheel with the leading end of a link 5 can overcome the force of the spring S and rock the carrier 17 to the position shown in dotted lines in FIG. 1.

The construction and arrangement of the parts of the apparatus are such that movement of the chain 1 in the direction of the arrow A will result in oscillating movement of the carrier 17 from the position shown in dotted lines in FIG. 1 to the position shown in full lines. When the carrier is in the dotted line position, the wheel 22 and the nozzles 25 and 26 are clear of the opening 6. When the carrier is in the full line position, the nozzles 25 and 26 will be located in the space 6 and will be below the plane of the upper surfaces of the connecting links 5. In the latter position the shaft 16 will have been rocked to such position that the contacts of the actuating switch 40 controlled by the shaft 16 will be closed.

The actuating switch 40 is mounted in a line 41 which extends between two power lines $L_1$ and $L_2$ which are connected to a suitable source of electrical energy. Also mounted in the line 41 is a normally closed switch 42 and a relay 43. The relay includes two normally open contacts 44 and 45, the contact 44 controlling a timer T which acts on the switch 42 to open the latter momentarily upon the lapse of a predetermined time. The relay contact 45 controls two solenoids 46 and 47 which control the operation of the valves $V_1$ and $V_2$, respectively.

In the operation of the apparatus, movement of the chain 1 in the direction of the arrow A will cause the carrier 17 to oscillate between the full line and dotted line positions shown in FIG. 1. In the full line position of the carrier, the switch 40 will be closed, thereby energizing the relay 43 to effect closing of the contacts 44 and 45 and opening of the valves $V_1$ and $V_2$. Lubricant from the tank 33 thus will be discharged under air pressure through the nozzles 25 and 26 which at this time will occupy positions substantially in the plane extending between two adjacent pivot pins 4. A spray of lubricant thus will be discharged from each nozzle, but in opposite directions, so as to lubricate the pivot joints at each end of the link. Preferably, the nozzle 25 is so arranged that the spray therefrom is aimed more toward the bar 2 than toward the bar 3, and the nozzle 26 is so arranged that the spray therefrom is aimed more toward the bar 3 than toward the bar 2.

The quantity of lubricant discharged from the nozzles 25 and 26 depends upon the air pressure, the size of the nozzles, the setting of the needle valve 37, and the length of time the valves $V_1$ and $V_2$ remain open. The size of the nozzles 25 and 26 will depend upon the size of the chain links and the pressure of the air will depend upon the spacing between adjacent pivot pins 4. In most cases, the time period required to effect proper lubrication will not exceed one-fourth to one-half second, and the timer T may be adjusted accordingly.

When the movement of the chain 1 effects engagement of the leading end of a link 5 with the wheel 22, the carrier 17 will be rocked counterclockwise to remove the nozzles from the space 6 and permit the wheel to ride upon the link 5.

It sometimes happens that the chain 1 will be caused to move rearwardly or oppositely to the direction of the arrow A. Should this occur while the wheel 22 is in one of the spaces 6, the mounting block 8 will be able to rock relatively to the support 7 about the pin 9, thereby preventing damaging of the carrier 17. The spring 10 will restore the carrier and the block 8 to their normal positions when the chain once again moves in the proper direction.

The disclosed embodiment is representative of a presently preferred form of the invention, but is intended to be illustrative rather than definitive thereof. The invention is defined in the claims.

I claim:

1. A lubricating system for lubricating a movable chain composed of links pivoted to one another at their ends, alternate links having an opening therein, said system comprising a source of lubricant; movable carrier means; lubricant discharge means adapted for accommodation in any one of said openings without engaging said links, said discharge means being carried by said carrier means for movement therewith and being in communication with said source; means mounting said carrier means adjacent said chain for movement of said discharge means between positions in which said carrier means may move into and out of the opening in any of said alternate links; and actuating means responsive to movement of said discharge means into an opening in any of said alternate links to discharge lubricant from said source in a spray through said discharge means.

2. The construction set forth in claim 1 including means responsive to operation of said actuating means to limit the quantity of lubricant discharged through said discharge means.

3. The construction set forth in claim 1 wherein said discharge means comprises a pair of nozzles one of which extends in the direction of movement of said chain and the other of which extends in the opposite direction.

4. The construction set forth in claim 1 including spring means acting on said carrier and yieldably urging the latter in a direction toward said chain.

5. The construction set forth in claim 4 including follower means carried by said carrier for engagement with said chain and being operable to overcome said spring means and move said carrier and said discharge means out of said opening.

* * * * *